US010831424B1

(12) United States Patent
Alacar et al.

(10) Patent No.: US 10,831,424 B1
(45) Date of Patent: Nov. 10, 2020

(54) AUTHENTICATION SYSTEM WITH REFRESH TOKENS TO PRINT USING A MOBILE APPLICATION

(71) Applicant: KYOCERA DOCUMENT SOLUTIONS INC., Osaka (JP)

(72) Inventors: Arthur Alacar, Pacheco, CA (US); Jin Liang, Dublin, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/423,419

(22) Filed: May 28, 2019

(51) Int. Cl.
    *G06F 3/12*     (2006.01)
    *H04W 12/06*     (2009.01)
    *H04L 29/06*     (2006.01)

(52) U.S. Cl.
    CPC .......... *G06F 3/1238* (2013.01); *G06F 3/1222* (2013.01); *G06F 3/1236* (2013.01); *H04L 63/0846* (2013.01); *H04W 12/06* (2013.01); *G06F 3/1292* (2013.01)

(58) Field of Classification Search
None
See application file for complete search history.

(56) References Cited

U.S. PATENT DOCUMENTS

| | | | |
|---|---|---|---|
| 2012/0092723 | A1 | 4/2012 | Jaudon et al. |
| 2015/0015908 | A1* | 1/2015 | Tanaka ................. H04N 1/4413 358/1.14 |
| 2015/0121501 | A1 | 4/2015 | Khalid et al. |
| 2017/0169422 | A1 | 6/2017 | Ye et al. |

\* cited by examiner

*Primary Examiner* — Dov Popovici
(74) *Attorney, Agent, or Firm* — Millen, White, Zelano & Branigan, P.C.; William Nixon

(57) ABSTRACT

An authentication system uses authentication tokens to print documents from third party applications to a printing device. A mobile device includes a mobile application that obtains information for the printing device. The mobile application requests that the third party application generate an authentication token using a refresh token. The refresh token is associated with user information for the third party application. The mobile application stores the authentication token for the third party application and the information at a document processing platform, which is separate from the printing device or application. The printing device provides its information to the document processing platform to receive the authentication token. The printing device provides the authentication token to the third party application to establish a connection to print documents through the mobile device.

20 Claims, 8 Drawing Sheets

AUTHENTICATION SYSTEM WITH REFRESH TOKENS TO PRINT USING A MOBILE APPLICATION

FIELD OF THE INVENTION

The present invention relates to printing at a printing device using token exchanges with a mobile device executing a mobile application. The mobile application uses a refresh token to facilitate the authentication for printing at the device.

DESCRIPTION OF THE RELATED ART

Existing devices run out of date programs or applications. Some of these programs may only be executed on older devices that are not compatible with newer applications. One may be unable to support integration of these devices with most available internet applications due to incompatibilities with common and recent technologies. Another problem is authenticating whether a user is able to access these applications at a device. Moreover, public devices may not have the capability to store and account for every possible application available to a large number of users.

SUMMARY OF THE INVENTION

A method for authentication of a third party application to connect to a printing device using a mobile application is disclosed. The method includes requesting a refresh token from a third party application by a mobile application. The method also includes generating the refresh token. The refresh token includes user information related to the third party application. The method also includes receiving the refresh token at the mobile application. The method also includes generating an authentication token in response to the refresh token. The method also includes establishing a connection between the third party application and the printing device based on the authentication token.

A method for using a refresh token with a mobile application to print a document is disclosed. The method includes providing user information to a third party application having a document. The method also includes generating a refresh token based on the user information. The method also includes providing the refresh token to a mobile application. The method also includes sending the refresh token to the third party application. The method also includes generating an authentication token in response to the refresh token. The method also includes printing the document directly to a printing device from the third party application using the authentication token.

A system to use a refresh token with a mobile application to establish a connection between a third party application and a printing device. The system includes a printing device having information. The system also includes a mobile device configured to execute a mobile application. The mobile device obtains the information for the printing device for use by the mobile application. The mobile application is configured to receive and to store a refresh token from a third party application. The refresh token includes user information associated with the third party application. The third party application is configured to generate an authentication token upon receipt of the refresh token from the mobile application. The system also includes a document processing platform to store the authentication token and the information for the printing device provided by the mobile application. The document processing platform is configured to provide the authentication token to the printing device upon receipt of the information from the printing device. A connection is established between the printing device and the third party application according to the authentication token.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1:
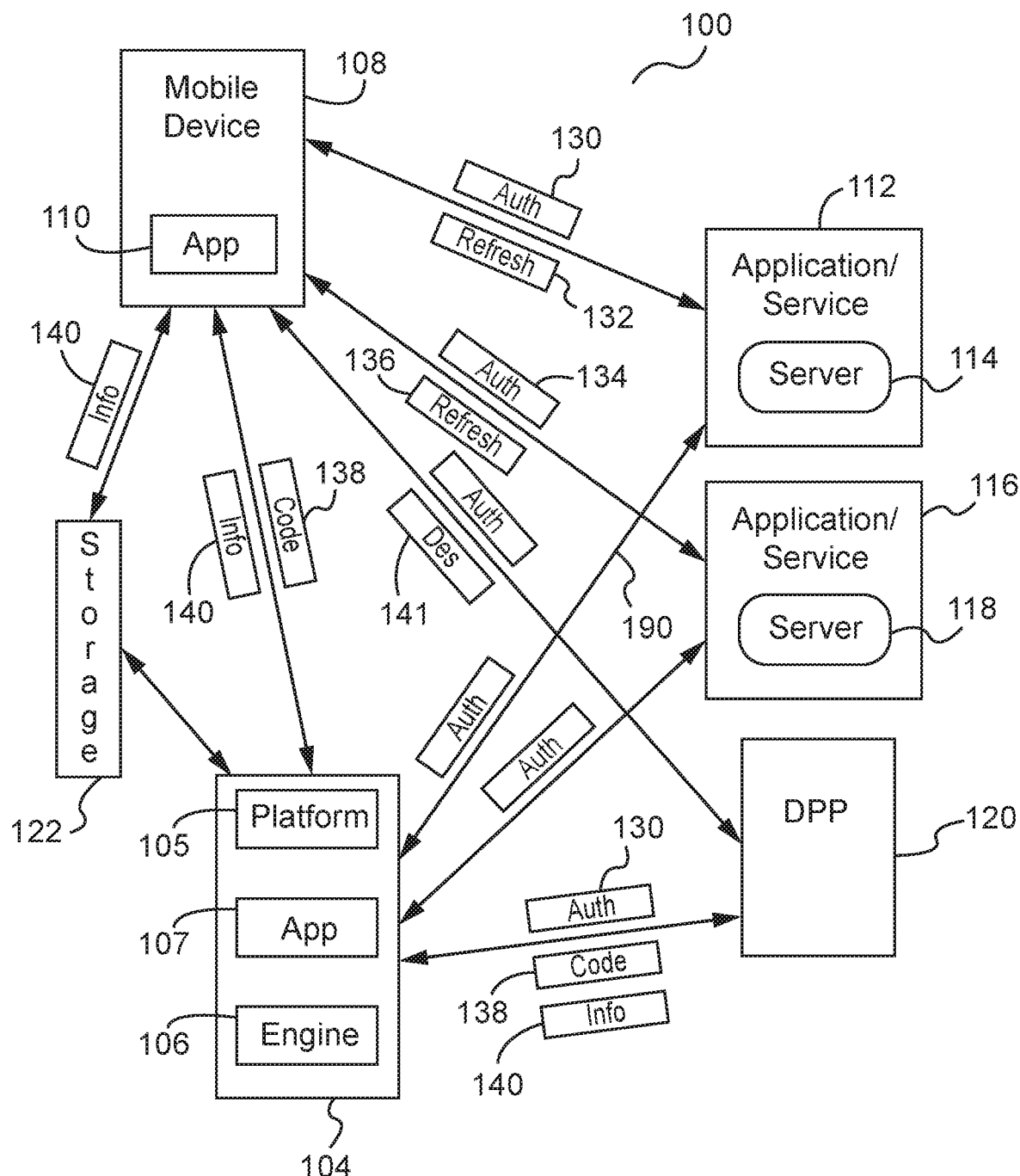
FIG. 1 illustrates a block diagram of a system to authenticate a user at a printing device using a mobile application according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments include an authentication framework that enables any application to obtain access to resources accessible by users in another application service, such as a social media platform, storage applications, email services, and the like. Using the authentication framework, an accessing application may obtain access to an internet application service after the user gives explicit permission to the accessing application. The underlying process to make this possible is through token exchanges that are defined as part of the authentication definition. The token may be kept by the accessing application. A mobile application becomes the accessing application during authentication only in order to receive an authentication token. In other embodiments, the mobile application may receive a refresh token. The token will be shared to the application on the printing device whenever a request is received to perform an operation with the internet, or third party, application.

Within the printing device, a software development platform is supported. The platform is a component available in most printing devices that enables third party developers to extend the functionalities of the printing devices. An application may be a software component that runs on the platform. Thus, the software development platform may allow customized applications to operate with the printing device or even a network of printing devices to optimize workflow. In this instance, the software development platform along with the associated authentication application may provide the features disclosed herein.

Using the disclosed authentication framework, a user may need to print a document or photo from a third party application, such as a DROPBOX™ account, on the printing device. Some printing devices include screens or interfaces to allow the user to enter information to authenticate herself. Other devices may not include such screens and, therefore, may not allow authentication to the printing device. Some devices also use legacy software platforms. Due to the limitations of the software development platform, the user first has to authenticate to her DROPBOX™ account through the disclosed mobile application. The user launches the mobile application on the mobile device and scans a graphic code on the printing device to obtain information or identification for the printing device.

The user successfully finishes the login process on the mobile application. The mobile application will get an authentication token from the DROPBOX™ server application programming interface (API). The mobile application saves the authentication token along with the identification or other information about the printing device to a document processing platform, which may be a server within the network of the printing device. The printing device keeps polling the document processing platform server until it finds a matching authentication token that is associated with its identification information. The printing device uses the authentication token to connect to the DROPBOX™ server successfully. The user then may select the files and finish printing the documents.

For example, in some embodiments, the systems uses identification information obtained by scanning a graphical code on the printing device to retrieve the authentication token. The user may log into the third party application using the mobile application. The mobile application receives the authentication token from the third party application. The mobile application may send a request with a password or a refresh token. The mobile application stores the identification information for the printing device and the authentication token at a document processing platform. The document processing platform may be a secure server separate from the printing device, the mobile device, or the third party application. The printing device provides its identification information to the document processing platform to retrieve the authentication token. Once the token is with the printing device, it establishes a connection with the third party application to print the document.

The refresh token may take the place of user information, such as a user name or password, when obtaining the authentication token from the third party application. A refresh token is provided to the third party application as confirmation of the identity of the user. The user of the mobile device may not want to input a user name or password every time that an authentication token is generated. Further, the transmission of such information repeatedly may lead to identify theft or the possibility of another person learning the user information. Thus, a refresh token may be stored on the mobile device for use by the mobile application when interacting with a third party application. The user information is not stored on the mobile device.

In some embodiments, the system may use a code, such as a personal identification number (PIN) code, generated by the mobile application to facilitate the authentication process. The user may log into the third party application using the mobile application. The mobile application obtains the authentication token from the third party application as disclosed above using a request or a refresh token. The mobile application also generates the code to associate with the authentication token. The mobile application stores the authentication token with the code on the document processing platform. The user may enter the code onto the printing device to request the connection to the third party application. The printing device retrieves the authentication token from the document processing platform using the entered code. Using the authentication token, the printing device establishes a connection with the third party application. The mobile device does not need to retrieve or obtain information from the printing device before pairing the authentication token and the code. The printing device may not need special information about the printing device. Further, the authentication processes may occur with the mobile device and the printing device being in different networks.

Some of the embodiments allow use of printing devices outside the user's network, such as within a store or public location. The user does not want to enter personal information onto the printing device. Further, such information may be stolen. Limits also may be placed on how much a user can use the printing device. Thus, the use of tokens allows the user to access a printing device without the need for personal or private information being entered onto the printing device.

FIG. 1 illustrates a block diagram of a system 100 to authenticate a user at a printing device 104 using a mobile application 110 according to the disclosed embodiments. System 100 includes different entities that perform various tasks in order to print documents at printing device 104. These entities may be connected over network. Further, each entity may be within its own network in that not every entity is connected to the same network.

Printing device 104 receives print jobs from various sources. Printing device 104 includes engine 106 to prepare and format the printing jobs. The components of printing device 104 are disclosed in greater detail by FIG. 2. Printing device 104 includes software development platform 105. Platform 105 may extend the capabilities of printing device 104 through the use of one or more applications 107. In some instances, however, platform 105 and application 107 are out of date or not supported. Further, third party applications may not directly access platform 105.

Mobile device 108 may communicate with printing device 104 to allow use of platform 105 by other applications or services within system 100. Mobile device 108 includes mobile application 110 that executes thereon. Mobile device 108 may receive authentication tokens 130 and 134 from third party applications 112 and 116, respectively, for use with mobile application 110. Mobile device 108 may scan an identification code 138 from printing device 104. Mobile application 110 may use identification code 138 to obtain identification information 140 for printing device 104. Alternatively, mobile device 108 may generate and provide code 138 that is used in authentication operations. FIG. 1 shows code 138 being received from or sent to printing device 104. Mobile application 110 also may utilize refresh tokens 132 and 136 for access to third party applications 112 and 116, respectively.

Mobile application 110 receives identification information 140 about printing device 104 using identification code 138. In some embodiments, mobile application 110 obtains identification information 140 about printing device 104 by scanning or inputting graphical code 138. Graphical code 138, in some instances, may be a QR code or a barcode. Identification code 138 may include identification information 140 so that mobile application 110 does not need to take further steps to obtain the information. Alternatively, the graphical code of identification code 138 may direct mobile device 108 to storage 122 on system 100 to retrieve identification information 140. Alternatively, information 140 may be stored on printing device 104 and provided to mobile device 108 upon presentation of code 138.

Alternatively, mobile application 110 generates code 138 for use on printing device 104. Preferably, code 138 in a PIN code that is entered directly onto printing device 104 using an operations panel, disclosed below, or other input device. For example, code 138 may be a four (4) digit code. In other embodiments, code 138 may be transmitted from mobile device 108 to printing device 104 such that an input device is avoided. Code 138 may be generated when requested by mobile application 110. Such a request may occur whenever the user selects a document to access within a third party application. As shown in FIG. 1, authentication code 130 and code 138 are stored at document processing platform 120.

Designator 141 for printing device 104 refers to either identification information 140 or identification code 138 that is used to indicate the printing device within document processing platform 120. In other words, mobile application 110 may obtain information about printing device 104 through a code 138 thereon. Alternatively, mobile application 110 may generate an identification code, such as a PIN code, that will be provided to printing device 104. Designator 141 includes data to verify the existence of either identification information 140 or code 138 from printing device 104. Mobile application 110 may store designator 141 until paired with the appropriate authentication token.

System 100 includes a plurality of third party applications or services that may use printing device 104 using mobile application 110. Mobile application 110 may interface with application 107 or platform 105 on printing device 104 to expand capabilities to new applications. Applications 112 and 114 are shown, but more applications may be implemented within system 100. Application 112 includes application server 114, which may store authentication token 130 and refresh token 132. Application 116 includes application server 118, which may store authentication token 134 and refresh token 136. In some embodiments, printing device 104 may communicate directly with applications 112 and 116 using the disclosed embodiments.

Document processing platform 120 may act as a backend server within system 100. In some embodiments, mobile application 110 stores authentication token 130 or 134 with identification information 140 on document processing platform 120. Alternatively, mobile application 110 may store received authentication tokens and a generated identification code 138 at document processing platform 120. Printing device 104 accesses document processing platform 120 for the authentication token for the requesting third party application using the code. The corresponding authentication token is provided to printing device from document processing platform 120. After this, the authentication token is removed from document processing platform 120. Code 138 or identification information 140 also may be removed from document processing platform 120 or mobile application 110.

The processes corresponding to the functions for the components of system 100 are disclosed in greater detail below. Using mobile application 110, third party application 112 may print to printing device 104, even though they are on separate networks. Printing device 104 may not directly connect to the applications. Mobile application 110 cannot provide the authentication tokens directly to printing device 104 because mobile device 108 and the printing device are on different networks. Mobile application 110 stores the appropriate tokens and information on document processing platform 120 to allow access by printing device 104.

In some embodiments, printing device 104 may provide identification information 140 to mobile application 110. This information is not needed in generating code 138 or authentication to a third party application. Identification information 140 also may pertain to error messages or other information regarding the status or usage rates of printing device 104. In some other embodiments, identification information 140 may be stored on storage 122 and provided to mobile application 110 when requested.

Figure 2:
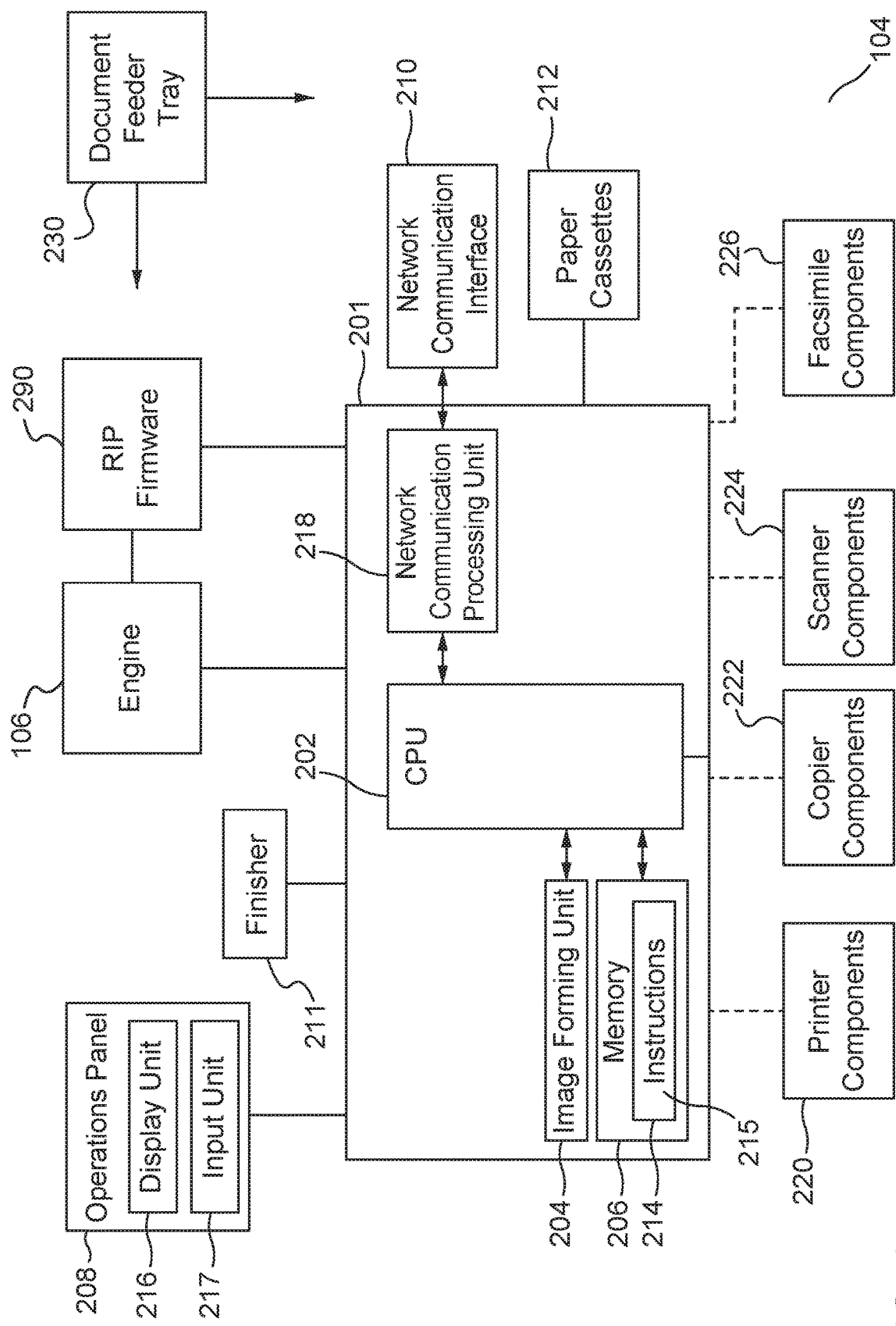
FIG. 2 illustrates a block diagram of components of the printing device used in conjunction with the authentication system according to the disclosed embodiments.

FIG. 2 illustrates a block diagram of components of printing device 104 used in conjunction with system 100 according to the disclosed embodiments. The architecture shown in FIG. 2 may apply to any multi-functional printer or image forming apparatus that scans documents to perform other functions, such as printing, storing, copying, and the like. As disclosed above, printing device 104 may send and receive data from mobile device 108, applications 112 and 116, and document processing platform 120.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to image the various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine firmware 106 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the authentication operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter an identification code 138 generated by mobile application 110 into printing device 104.

Printing device 104 also includes network communication processing unit 218. Network communication processing unit 218 may establish a network communication, such as a wireless or wired connection with one or more other image forming apparatuses and a server in an image forming system. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 106. Engine 106 may be a combination of hardware, firmware, or software components that act accordingly to accomplish a task. For example, engine 106 is comprised of the components and software to print a document. It may receive instructions from computing platform 201 after user input via operations panel 208. Alternatively, engine 106 may receive instructions from other attached or linked devices.

Engine 106 manages and operates the low-level mechanism of the printing device engine, such as hardware components that actuate placement of toner onto paper. Engine 106 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 106 for actual rendering of an image and application of the toner onto paper during operations on printing device 104.

Figure 3:
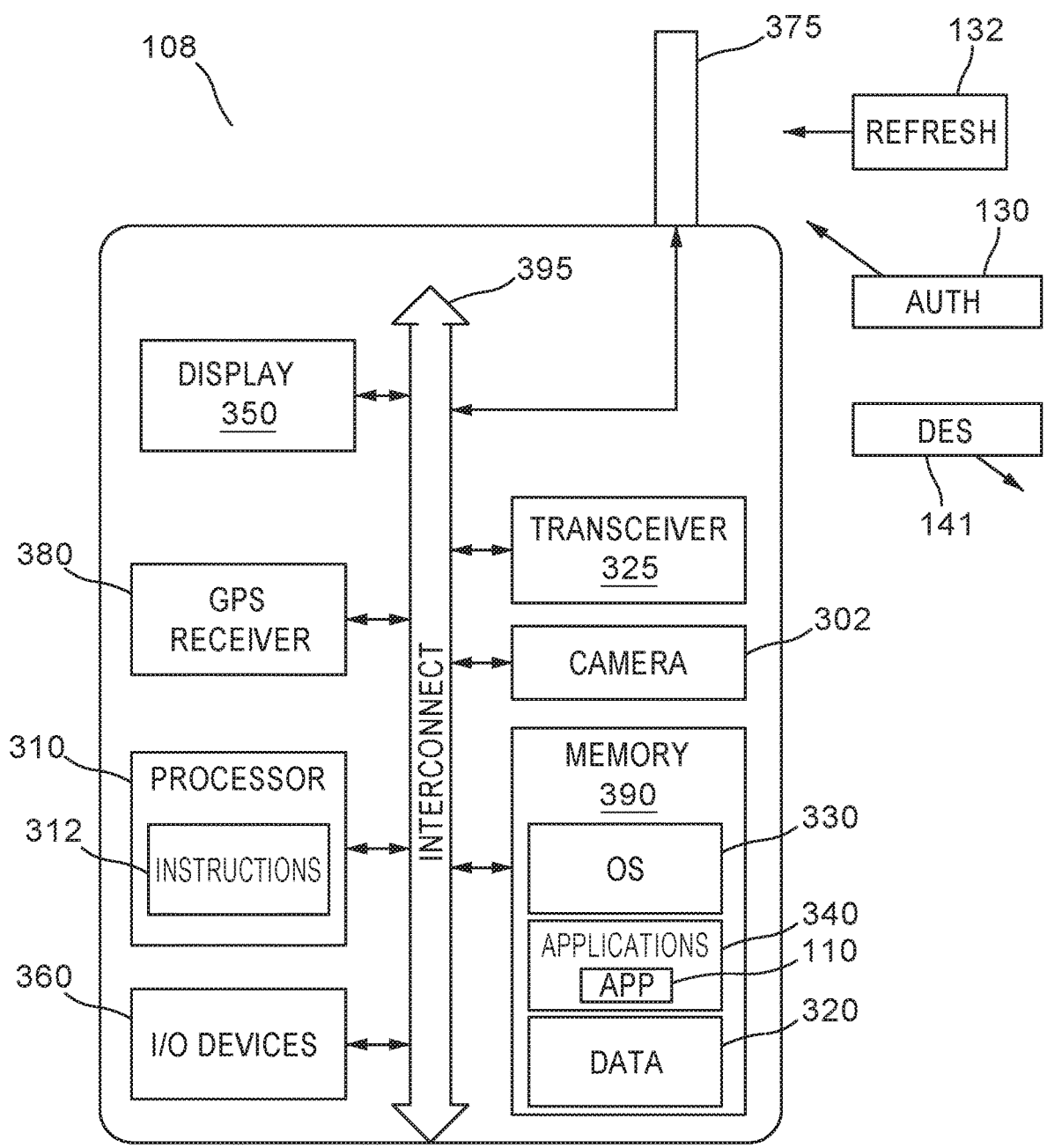
FIG. 3 illustrates a block diagram of the components for a mobile device executing the mobile application for use with the authentication system according to the disclosed embodiments.

FIG. 3 illustrates a block diagram of the components in mobile device 108 for use with system 100 according to the disclosed embodiments. Mobile device 108 executes mobile application 110 to enable authentication operations within system 100. Mobile device 108 may include a processor 310. Processor 310 may be any of a variety of different types of processors suitable for mobile devices. Processor 310 executes instructions 312. Instructions 312 may be loaded into processor 310 in order to configure mobile device 108 to perform specified functions or operations. These instructions may come from applications 340 stored in memory 390, or may be partially or wholly hardwired as part of processor 310.

Memory 390, such as random access memory (RAM), a flash memory, or other type of memory, is accessible by processor 310. In some embodiments, memory 390 may be partially comprised of read-only memory (ROM). Memory 390 may be configured to store an operating system (OS) 330, data 320, and applications 340. Applications 340 include client agents, mobile applications, and mobile location-enabled applications that may provide location-based services to the user. Data 320 may include data received from the other entities in system 100, such as printing device 104 and applications 112 and 116.

Processor 310 may be coupled, either directly or via appropriate intermediary hardware, to a display 350 and to one or more input/output (I/O) devices 360, such as a keypad, a touch panel sensor, a microphone, and the like. Processor 310 also may be coupled to transceiver 325 that interfaces with an antenna 375 to send and receive data within system 100. Transceiver 325 may be configured to transmit and receive cellular network signals, wireless data signals, or other types of signals via antenna 375. Mobile device 108 may be configured by an application 340 to receive and transmit specific types of signals. Mobile device 108 also may include a port or connection through I/O devices 360 to communicate with a device connected by a wire or other physical connection. In some embodiments, a global positioning system (GPS) receiver 380 also may make use of antenna 375 to receive GPS signals.

Mobile device 108 also includes camera 302. Camera 302 may capture images for use by applications 340. Specifically, camera 302 may act as a scanner to capture graphical codes for use by mobile application 110. The appropriate application within applications 340 may control camera 302.

Each of camera 302, display 350, transceiver 325, GPS receiver 380, processor 310, memory 390, I/O devices 360, and antenna 375 may be connected to interconnect 395. Alternatively, the components of mobile device 110 may be connected directly or indirectly to one or more of each other. Interconnect 395 may be one or more mobile device communications systems such as a bus or other hardware to enable communication between the components of mobile device 108.

Applications 340 include mobile application 110 to enable authentication processes between printing device 104 and applications 112 and 116. The following disclosure will focus on the interaction between mobile application 110 and application 112, though the same principles may be applied to any application or service within system 100. Mobile device 108 receives authentication token 130 and refresh token 132 from application 112. The use of these tokens by mobile application 110 is disclosed in greater detail below. The tokens are received in a signal to mobile device 108.

Authentication token 130 may be a scrambled string of data generated by the provider that is recognized when presented to the provider. In this instance, the provider is a third party application 112 that provides some service associated with the user of mobile device 108. Preferably, authentication token 130 is not authored but reserved by the user using a request. In some embodiments, authentication token 130 includes an expiration date so that it is used within a set period of time. In other embodiments, a flag may be set on the number of times the authentication token is used. Mobile application 110 may store multiple tokens from multiple third party applications or services in memory 390.

Refresh token 132 also may be a scrambled string of data associated with the user information for the user of mobile device 108. Third party application 112 generates refresh token 132 when requested. Preferably, mobile application 110 will request a refresh token. Alternatively, a refresh token may be provided when the user accesses the third party application using mobile application 110. Refresh token 132 may not expire in the sense that a new one needs to be generated every time a connection 190 is established. Refresh token 132 corresponds to user information and not to a printing device or a document. In some embodiments, the scrambled string of data may be based on the user information.

Mobile application 110 also may generate identification code 138 for use in some embodiments. Code 138 may be a verification code that is provided to printing device 104 to obtain authentication code 130. As disclosed above, code 138 may be a PIN code, such as 1234 or 123456. Code 138 may be randomly generated and assigned to printing device 104. Alternatively, the user may create code 138. Code 138 is not limited to a PIN code as other codes may be used, as long as they may be generated by mobile application 110. For example, mobile application 110 generates an alphanumeric string of characters to be entered at printing device 104. In some embodiments, code 138 may be generated by printing device 104 and sent to mobile device 108. Designator 141 is shown in FIG. 3 as representative of data or information about printing device 104 used in system 100.

Mobile application 110 also may use refresh token 132. Refresh token 132 also is generated by application 112. When mobile application 110 requests an authentication token 130, it would provide a refresh token 132 to application 112. Refresh token 132 may be used in lieu of a user name and password. The user may not want to store the user name or password on mobile device 108. If mobile device 108 is lost, then the user can remove the applicable refresh token so that an unauthorized user cannot access the third party application to request an authentication token. Refresh token 132 also may be stored by mobile application 110 in memory 390.

Figure 4:
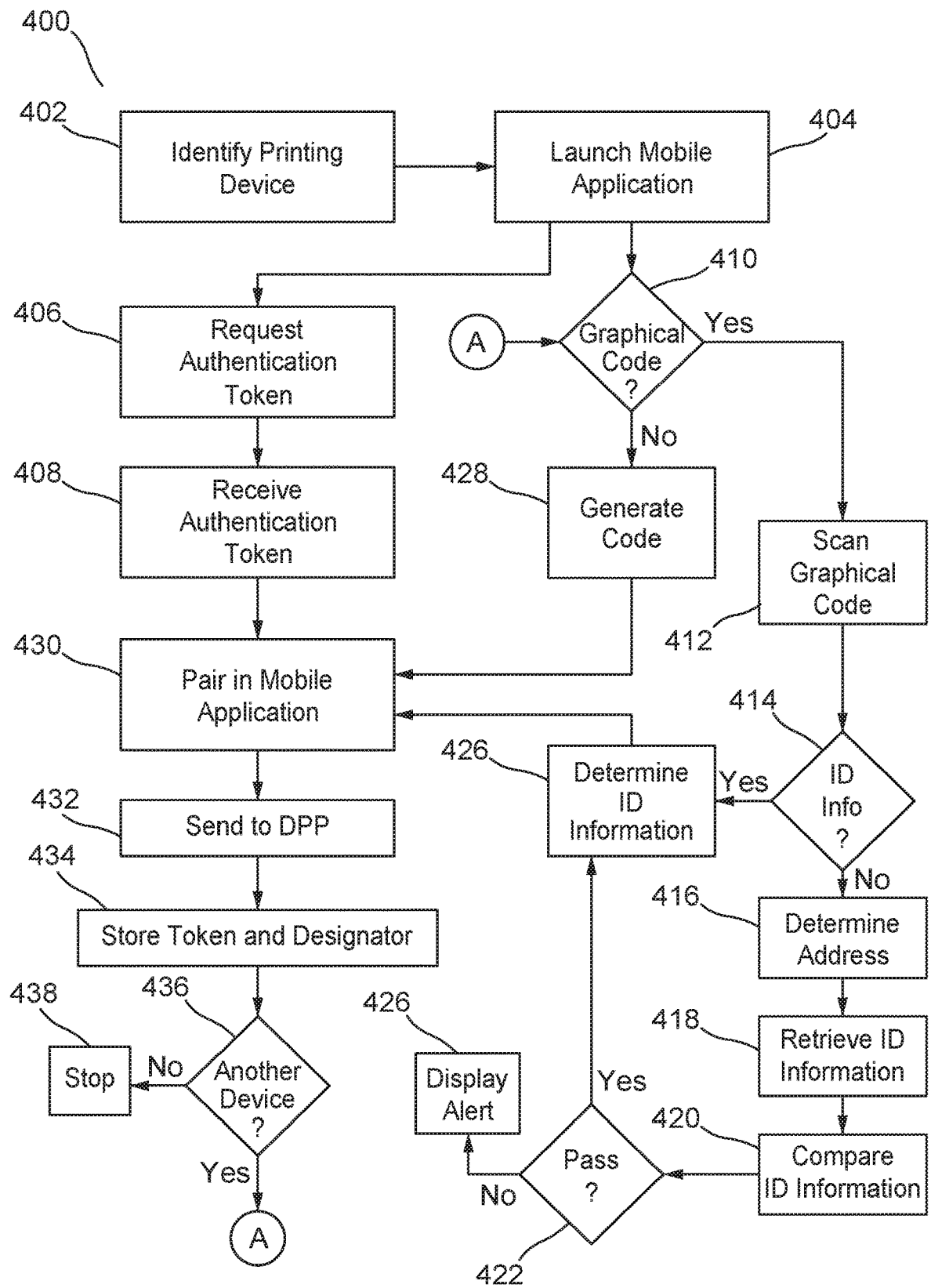
FIG. 4 illustrates a flowchart for pairing an authentication token and a designator for the printing device according to the disclosed embodiments.

FIG. 4 depicts a flowchart 400 for pairing an authentication token 130 and a designator 141 for printing device 104 according to the disclosed embodiments. The disclosure of flowchart 400 may refer to features shown in FIGS. 1-3 for illustrative purposes. The embodiments disclosed by flowchart 400, however, are not limited to the features of FIGS. 1-3. The discussion of flowchart 400 discloses the use of authentication token 130 but the same principles apply to authentication token 134 of third party application 116.

Step 402 executes by identifying printing device 104 by a user of mobile device 108. In some embodiments, printing device 104 and mobile device 108 are not in the same network. For example, printing device 104 may be on a network for its location, such as a store or public network. Mobile device 108 is on a separate cellular or wireless network. Thus, mobile device 108 is not a "trusted" device connected to printing device 104. Any operations performed on printing device 104 should be authenticated, especially if printing or performing jobs from a third party application.

Step 404 executes by launching mobile application 110 on mobile device 108. In some embodiments, processor 310 loads instructions 312 for mobile application 110 thereon to configure mobile device 110 to perform the functions and operations disclosed below. In some embodiments, mobile application 110 may be launched or enabled for a period of time before it shuts off. One should pair printing device 104 with mobile application 110 and code 138 or identification information 140 within this period of time.

Mobile application 110 may perform separate functions at this point. Flowchart 400 shows two possible processes. Steps 406-420 relates to obtaining an authentication token while step 424 relates to generating the code to use with printing device 104. In some embodiments, these processes may be performed at the same time or in an order. For example, mobile application 110 may generate code 138 as soon as printing device 104 is detected and before an authentication token is generated.

Flowchart 400 shows two paths to further execute the disclosed embodiments. Steps 406 and 408 relate to generating authentication token 130. These steps are disclosed in greater detail in FIG. 5. Steps 410-426 disclose obtaining identification information 140 from identification code 138 or, if no code is on printing device 104, generating identification code 138 for use in printing operations by mobile application 110. Steps 406-408 may execute simultaneously with steps 410-426. Alternatively, the separate groups of steps may be executed at different times as determined by mobile application 110.

Step 406 executes by requesting authentication token 130 from third party application 112 by mobile application 110. Authentication tokens are generated by their respective applications. Application 112 generates authentication token 130 while application 116 generates authentication token 134. Step 408 executes by receiving authentication token 130 at mobile application 110 from third party application 112. Mobile application 110 may store the authentication token until the information needed to pair printing device 104 is received. Flowchart 400 proceeds to step 430, which is disclosed below.

Step 410 executes by determining whether printing device 104 includes an identification code for retrieval by mobile application 110. In some embodiments, identification code 138 will be a graphical code on printing device 104, such as a Quick Response (QR) code or bar code. In other embodiments, printing device 104 may provide identification code 138 to mobile application 110. If there is no graphical code on printing device 104, then an identification code will have to be generated by mobile application 110. Thus, the disclosed embodiments can process information for printing device 104 with or without a code available at printing device 104.

If step 410 is yes, then step 412 executes by scanning the graphical code using mobile application 110. Preferably, the graphical code is shown as identification code 138 and is located on printing device 104 as a bar code or a QR code such that mobile device 108 uses camera 302 to capture an image of the graphical code. An application 340 determines the information located within the graphical code and provides this information to mobile application 110.

Step 414 executes by determining whether the information within identification code 138 includes identification (ID) information 140 about printing device 104. There are two ways to obtain the identification information for printing device 104. In some embodiments, the identification information is within the graphical code itself. A serial number or other unique identification specific to printing device 104 is provided. In other embodiments, identification code 138 includes a locator or address to retrieve identification information 140 as it is stored elsewhere on system 100. In some other embodiments, identification information 140 may be stored on printing device 104, such as on memory 206. The graphical code directs mobile application 110 to the address within memory 206 to retrieve the information. FIG. 1 shows these different embodiments.

If step 414 is no, then step 416 executes by determining the address for identification information 140. For example, identification information 140 may be stored on storage 122 at an address therein. The graphical code of identification code 138 directs mobile application 110 to storage 122 using an Internet protocol (IP) address, for example, within the code. Step 418 executes by retrieving identification information 140 for printing device 104 from the address in storage 122. Again, identification information 140 may be a serial number or some designator that uniquely identifies printing device 104.

Step 420 executes by comparing identification information 140 with validation information available for printing device 104. Mobile application 110 may compare part of the retrieved information with known information to verify that the retrieved information is correct. Step 420 also may verify that the user of mobile application 110 has permission to access identification information 140. For example, the user of mobile device 108 may not be allowed to use printing device 104. Step 422 executes by determining whether the comparison of identification information 140 indicates a "pass" in that the retrieved information is correct or that printing device 104 may be used for operations. If yes, then flowchart 400 proceeds to step 426. If step 416 is no, then step 424 executes by displaying an alert or other notification on mobile device 108 that a problem exists.

If step 414 is yes, then it is determined that identification information 140 is within the graphical code of identification code 138 and no operations to obtain the information over system 100 should be taken. Flowchart 400 proceeds to step 426. In some embodiments, identification information 140 may be stored on printing device 104. The graphical code of identification code 138 indicates the address in the memory on the printing device. Step 426 executes by determining identification information 140 for printing device 104. Mobile application 110 may receive the information and generate any other data needed to proceed with authentication operations. Flowchart 400 proceeds to step 430.

If step 410 is no, then an identification code 138 is not available at printing device 104. Thus, step 428 executes by generating an identification code for use with authentication token 130. This identification code also is shown as identification code 138 in FIGS. 1 and 3. Step 424 may execute when instructed by mobile application 110. As disclosed above, generated identification code 138 may be a PIN code comprised of numbers or alphanumeric characters. Mobile application 110 generates identification code 138 in these embodiments. Alternatively, code 138 may be generated elsewhere and sent to mobile device 108. This step also may include determining whether code 138 is compatible with printing device 104. The code is used by printing device 104 for further operations. It must be able to be read or receive code 138. For example, operations panel 208 should be able to accept letters if code 138 includes them therein. If such an incompatibility exists, then mobile application 110 may regenerate code 138 according to the correct specifications for printing device 104.

Step 430 executes by pairing authentication token 130 and identification information 140 or identification code 138 by mobile application 110. The appropriate identifier for printing device 104 may be known as designator 141, as shown in FIG. 1. The designator for printing device 104 depends on how information to indicate printing device 104 is provided, as disclosed above. Mobile application 110 also receives token 130 to pair with designator 141. Step 428 executes by sending authentication token 130 and designator 141 to document processing platform 120, as shown in FIG. 1. Document processing platform 120 may act as a backend server that is not dedicated to specific printing devices or applications. It also keeps tokens and identification information protected. The tokens and codes are not kept on mobile device 108 or printing device 104. Step 430 executes by storing authentication token 130 and designator 141 at an address within document processing platform 120. As disclosed above, designator 141 may include identification information 140 or identification code 138. In this manner, token 130 and the appropriate information for printing device 104 are paired at platform 120. This feature may be disclosed in greater detail below.

Step 436 executes by determining whether another printing device should be considered by the authentication process of flowchart 400. If no, then step 438 stops flowchart 400. If yes, then flowchart 400 proceeds to 410 using step A to determine whether the second printing device includes a graphical code to scan using mobile application 110. Thus, a second printing device may be used with authentication token 130 to establish a connection with application 112. The user would use a different designator 141 for the second printing device. Further, flowchart 400 also could proceed to step 406 to obtain a second authentication token, such as token 134 from application 116. For example, designator 141 may remain the same as generated from mobile application 110 but used with authentication token 134.

Mobile application 108 does not store any information about mobile device 108 or the user on printing device 104.

This feature allows for personal or private information to remain on mobile device 108. The user is not required to enter such information on printing device 104. Thus, the need to accept many different user name and password formats is removed as well as trying to resolve many different users and networks using printing device 104. Printing device 104 does not need to store or maintain account information for the user or mobile device 108. Legacy devices may be used as well as devices having older platforms that do not support applications to print and perform jobs from mobile platforms.

Figure 5:
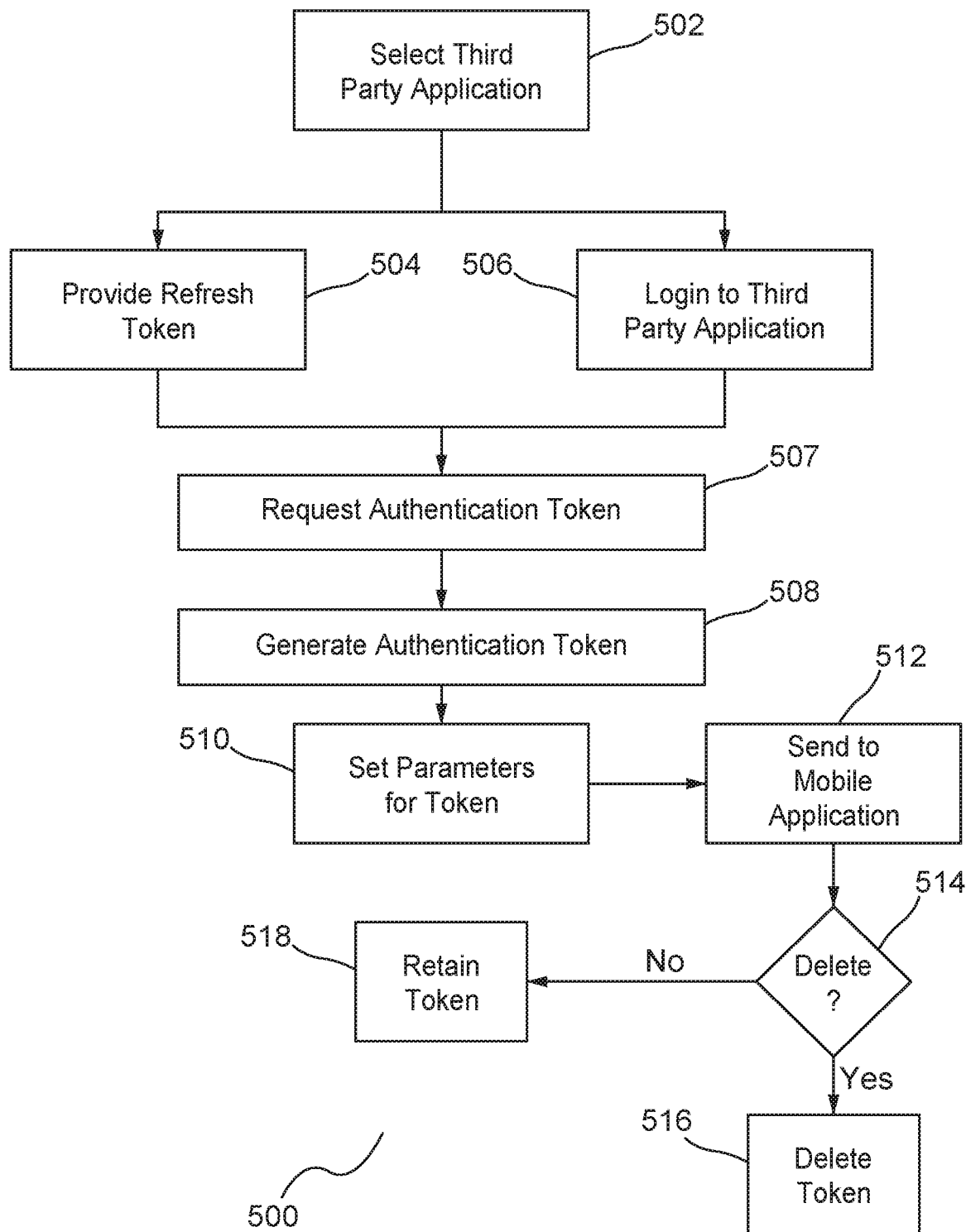
FIG. 5 illustrates a flowchart for generating an authentication token according to the disclosed embodiments.

FIG. 5 depicts a flowchart 500 for generating authentication token 130 according to the disclosed embodiments. Flowchart 500 further discloses steps 406 and 408 of flowchart 400. The disclosure of flowchart 500 may refer to features shown in FIGS. 1-3 for illustrative purposes. The embodiments disclosed by flowchart 500, however, are not limited to the features of FIGS. 1-3. Further, the discussion of flowchart 500 discloses the use of authentication token 130 but the same principles apply to authentication token 134 of third party application 116.

Step 502 executes by selecting a third party application to establish a connection with printing device 104 in order to print a document. Use of third party application 112 is disclosed below, but the steps may be used with any application or service within system 100. As disclosed above, a document or file maybe be within application 112 or part of a service that provides files to the user. It should be noted that the document or file is not required to be stored on mobile device 108. The user may remotely use mobile application 110 to print the document from application 112 on printing device 104 to be picked up later. Application 112 also may not be on a network or other platform with printing device 104 or mobile device 108.

Steps 504 and 506 may be executed in the alternative or they may be executed simultaneously. Steps 504 and 506 verify the identity of the user of mobile application 110 to third party application 112. Step 504 executes by providing refresh token 132 to application 112. Refresh token 132 may provide the credentials to verify the user to application 112. Refresh token 132 may be stored by mobile application 110 on mobile device 108. Refresh token 132 also is generated by application 112. The token may include data to identify mobile device 108 as permissible to use within system 100. It may be provided to mobile application 110 on a specified basis so that an invalid user cannot utilize mobile device 108 to access application 112 or print documents using the disclosed embodiments. The user controls refresh token 132. It should be noted that refresh token 132 is not used with printing device 104.

Step 506 executes by logging into third party application 112 through mobile application 110 to provide a user name and password to verify the status of the user. Alternatively, mobile application 110 may provide these to application 112 without the user entering such information on mobile device 108. Other identification information for the user may be used beyond a user name or password.

Step 507 executes by requesting an authentication token from application 112. The user may select the desired application using an interface through mobile application 110. Alternatively, the user may access the desired application directly and request an authentication token. Step 508 executes by generating authentication token 130 by application 112. As disclosed above, authentication token 130 may be a scrambled string having information recognizable by application 112 to verify access to the documents within. In this manner, third party application 112 controls how the tokens are generated. In some embodiments, application 112 may generate and store authentication tokens on its server 114 for use when requested.

Step 510 executes by setting parameters for authentication token 130. An authentication token may not last for an extended period of time. Application 112 may want a token to expire after a certain point to prevent unauthorized access to its documents and files. Thus, an expiration parameter may be set to delete authentication token 130 from mobile application 110. The expiration parameter may be a predetermined time or date, such as two months from the date of issuance to mobile application 110. Alternatively, the token may be removed after a number of uses of the token. The authentication token may be used to allow access to application 112 for a certain number of print jobs. After that number of print jobs are completed, the token expires.

Step 512 executes sending authentication token 130 from application 112 to mobile application 110. Referring to FIG. 3, authentication token 130 is sent over a network to mobile device 108. Mobile application 110 then may store authentication token 130 on mobile device, such as in memory 390. The token may be stored on mobile device 108 subject to the expiration parameter set in step 510. If the user goes to another printing device, then the user does not need to reauthenticate because authentication token 130 is on mobile device 108.

Step 514 executes by determining whether to delete authentication token 130 from mobile application 110. Authentication token 130 may be set to expire according to an expiration parameter, as disclosed above. Other criteria also may be used to delete tokens. For example, mobile application 110 may be allowed to store only a certain number of tokens for use with designators 141. Thus, older tokens may be deleted or new tokens not accepted. If a token is deleted from mobile application 110, then it also is deleted from application 112. If step 514 is yes, then step 516 executes by deleting authentication token 130 from mobile application 110. If step 514 is no, then step 518 executes by retaining authentication token 130 for use in step 430.

Figure 6:
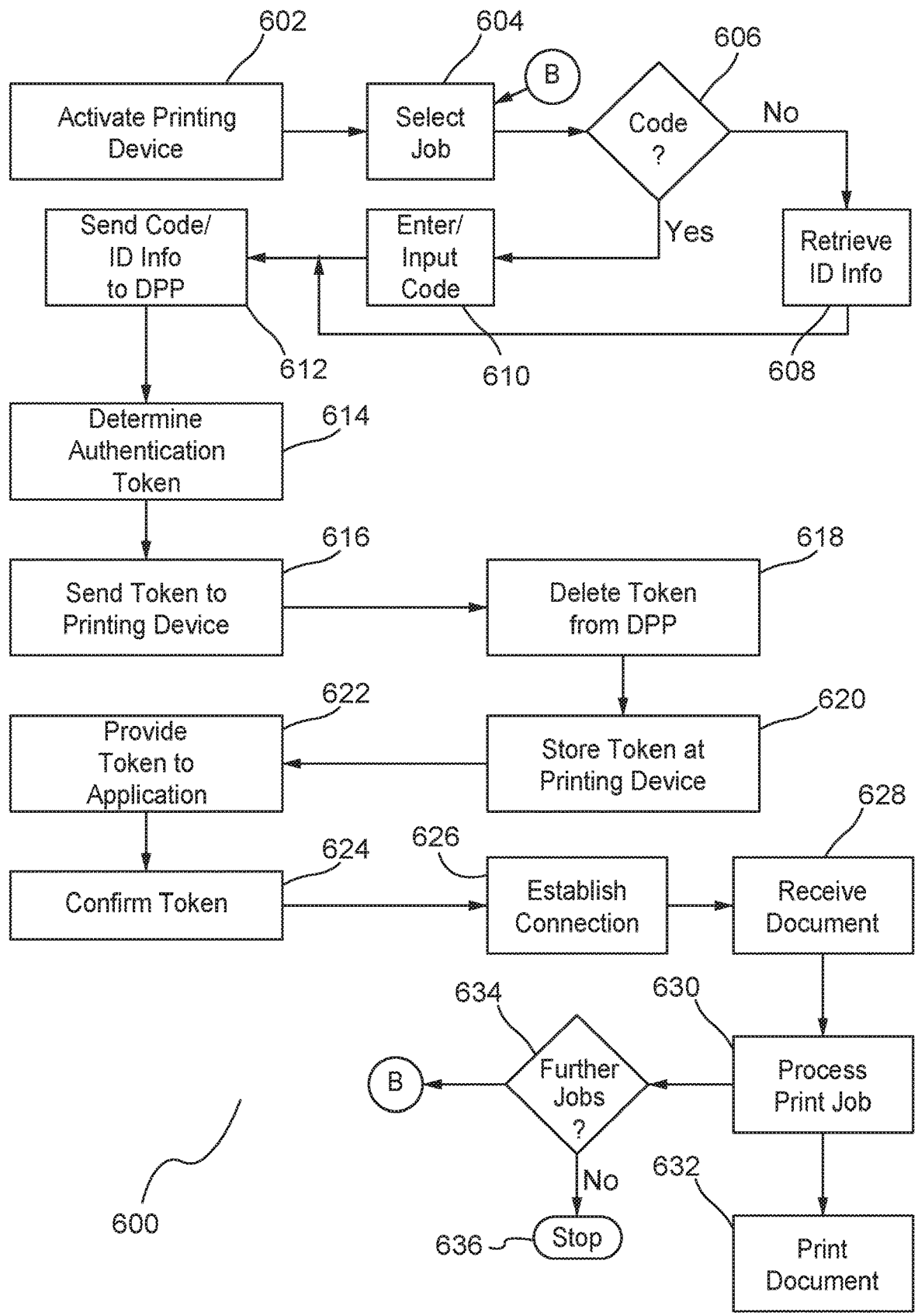
FIG. 6 illustrates a flowchart for establishing a connection between a printing device and a third party application according to the disclosed embodiments.

FIG. 6 illustrates a flowchart 600 for establishing a connection 190 between printing device 104 and third party application 112 according to the disclosed embodiments. The disclosure of flowchart 600 may refer to features shown in FIGS. 1-3 for illustrative purposes. The embodiments disclosed by flowchart 600, however, are not limited to the features of FIGS. 1-3. Further, the discussion of flowchart 600 discloses the use of authentication token 130 but the same principles apply to authentication token 134 of third party application 116.

Step 602 executes by activating printing device 104. Printing device 104, however, may already be activated and ready to receive jobs from other devices. Step 604 executes by entering or selecting a print job to be performed on printing device 104. Preferably, the print job is that mobile device 108 wishes to print a document from application 112. "Job" may be referred to as a print job below but also refers to other jobs that may be performed on a printing device, such as storing an electronic copy of a received document or making the document available for editing.

Step 606 executes by determining whether the user should provide or input a code to printing device 104 to print the document. Referring back to FIG. 4, designator 141 may be identification information 140 obtained from printing device 104 or identification code 138 generated by mobile application 110. Mobile application 110 may determine which identifying information should be used for printing device 104 so that such information is provided to document processing platform 120.

If step 606 is no, then step 608 executes by retrieving identification information 140 from printing device 104. As disclosed above, identification information 140 may be a number or other information uniquely identifying printing device 104 within system 100. If step 606 is yes, then step 610 executes by entering or inputting identification code 138 at printing device 104. In some embodiments, code 138 is entered onto operations panel 208 as a PIN. The user types the PIN into panel 208 or input unit 217. Alternatively, mobile device 108 may forward code 138 to printing device 104. In these embodiments, code 138 is not limited to a PIN code but may be a string or other form of data recognizable by printing device 104. In some embodiments, printing device 104 may read code 138 as it is displayed on mobile device 108.

Step 610 also may confirm that code 138 is acceptable. Printing device 104 may use codes of a certain format or structure. If code 138 is incompatible with the format or structure, then an alert may be displayed on printing device 104 or sent to mobile device 108. Further, some embodiments may confirm that the received code will be accepted by document processing platform 120, as disclosed below. Printing device 104 would not want to send an improper code to platform 120.

Step 612 executes by sending identification information 140 or identification code 138 to document processing platform 120. As disclosed above, printing device 104 and platform 120 may be on different networks. Identification information 140 or identification code 138 allows platform 120 to verify that printing device 104 can receive authentication token 130. Step 614 executes by determining the appropriate authentication token to provide to printing device 104 using identification information 140 or identification code 138. As disclosed above, mobile application 110 pairs code 138 and authentication token 130. Document processing platform 120 uses the received information or code to identify the authentication token to send to printing device 104.

Step 616 executes by sending authentication token 130 to printing device 104. Step 618 executes by deleting authentication token 130 from document processing platform 120. The deletion of the authentication token determined above prevents continued use of printing device 104 to access application 112. For example, another user may not enter code 138 and gain access to documents in application 112. It also may prevent the actual user from continuous use of printing device 104 without additional authorizations.

Step 620 executes by storing authentication token 130 at printing device 104. Authentication token 130 may be stored in memory 206. Step 622 executes by providing authentication token 130 to third party application 112. In some embodiments, this step may be executed after selecting the print job to be performed. In other words, steps 606-622 do not execute after a print job is selected but on request of printing device 104. Step 624 executes by confirming authentication token 130 is valid by application 112. Application 112 may check to see if authentication token 130 is recognized as a legitimate token.

Step 626 executes by establishing a connection 190 between printing device 104 and application 112. Application 112 receives authentication token 130 and verifies that printing device 104 has been selected by an authorized user of mobile application 110 to print and process documents from the application. Thus, a secure connection may be established between the device and the application without the need to send tokens or other data from mobile device 108.

Step 628 executes by receiving the document to print from application 112. The user may select the document using mobile application 110. Alternatively, the user may select the document using application 112, which in turn launches mobile application 110 to establish the secure connection. The document is received at printing device 104. Step 526 executes by processing the print job on printing device 104. Step 632 executes by printing the document at printing device 104.

Step 634 executes by determining whether further jobs should be processed using printing device 104. If no, then step 636 executes by stopping operations. If yes, then flowchart 600 returns to step 604 using step B. This return indicates that the print job will come from another application, such as third party application 116. If so, then printing device 104 will send authentication token 134 to application 116 to establish a connection to print documents therefrom.

Figure 7:
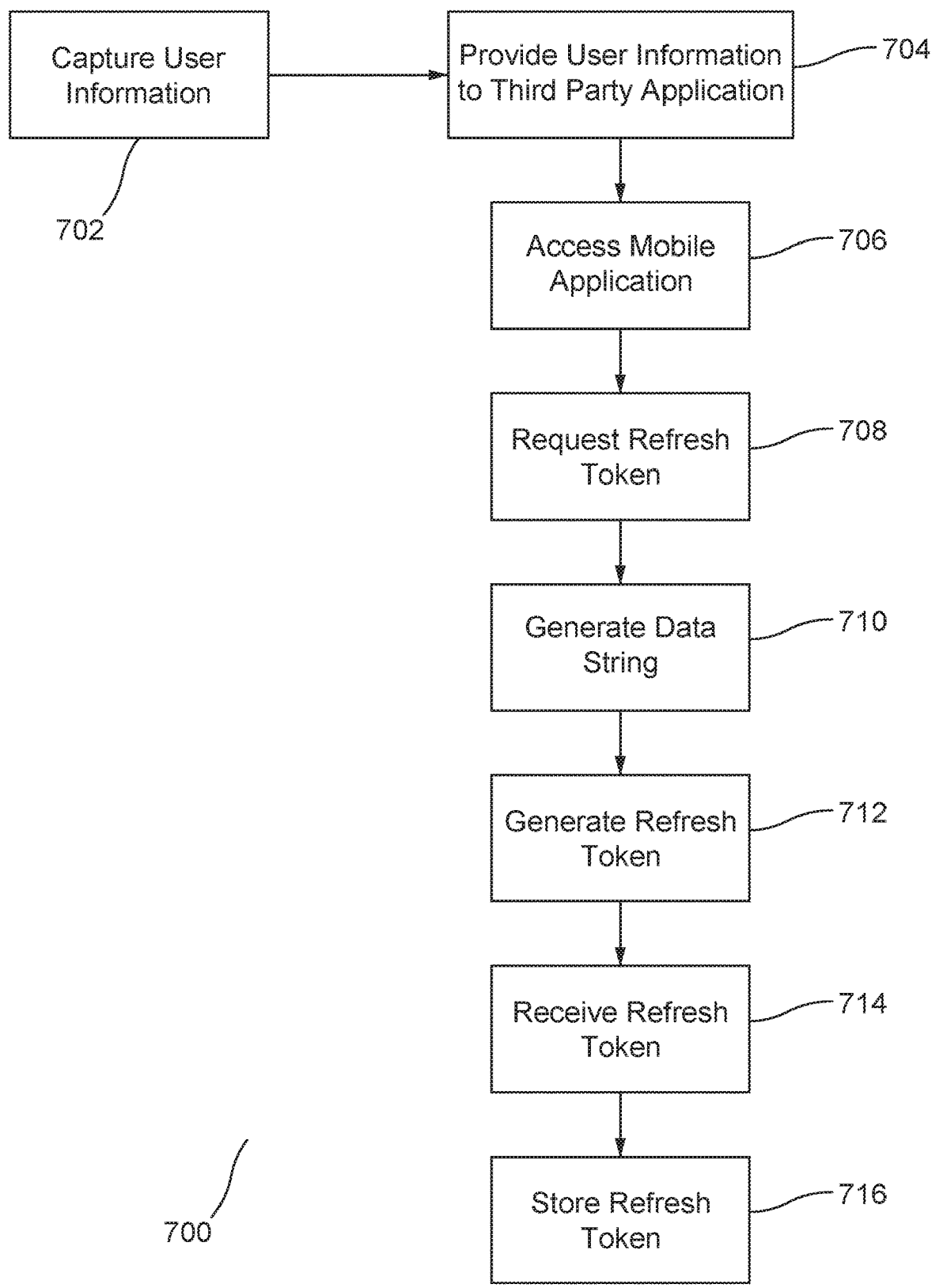
FIG. 7 illustrates a flowchart for generating a refresh token according to the disclosed embodiments.

FIG. 7 depicts a flowchart 700 for generating refresh token 132 according to the disclosed embodiments. The disclosure of flowchart 700 may refer to features shown in FIGS. 1-3 for illustrative purposes. The embodiments disclosed by flowchart 700, however, are not limited to the features of FIGS. 1-3. Further, refresh token 136 may be generated and used in the same manner as refresh token 132, as disclosed below.

Step 702 executes by capturing the user information for a third party application that is to be accessed by mobile device 108. In some embodiments, the user inputs user information, such as a user name or password. The user may input the user information to mobile application 110. Other forms of user information may be used such as a picture for facial recognition, account number information, identification numbers, and the like. The user may capture this information on one device and send it to mobile device 108. In some embodiments, a graphical user interface may be provided by mobile application 110 to capture the user information.

Step 704 executes by providing the captured user information to third party application 112. Such information may be used to open an account with the application or used to verify the identify of the user. Third party application 112 may keep such information securely on server 114. Step 706 executes by accessing mobile application 110 to obtain refresh token 132. The user may indicate that user information is available at third party application 112 and to receive the appropriate refresh token. Step 708 executes by requesting refresh token 132 from third party application 112 from mobile application 110.

Step 710 executes by generating a data string based on the user information. The data strings corresponds to the user information such that it identifies that the possessor of the data strings, such as in a refresh token, is the user. An algorithm or other process may be used to generate the data string. Step 712 executes by generating refresh token 132 from the data string. Refresh token 132 is data for use with third party application 112.

Step 714 executes by receiving refresh token 132 at mobile application 110. Preferably, third party application 112 sends refresh token 132 to mobile device 108 upon receipt of the request. Alternatively, refresh token 132 may be provided when mobile device 108 accesses the third party application. Step 716 executes by storing refresh token 132 on mobile device 108. Refresh token 132 may be stored until needed by mobile application 110. In some embodiments, refresh token 132 does not expire and may be used more than once in accessing third party application 112. In other embodiments, refresh token 132 is stored at mobile device 108 until instructed to delete it by the user.

Thus, user information for third party application 112 is not stored on mobile device 108. Further, the user does not need to provide such information every time third party application 112 is accessed. Private user information is not repeatedly being sent over potentially unsecure networks. Further, if mobile device 108 is lost or stolen, then the user information will be available to another user. The user can invalidate the refresh token to deny access to third party application 112 by the other user. Does not need to redo user information or cancel account because only refresh token 132 is to be removed or invalidated.

Figure 8:
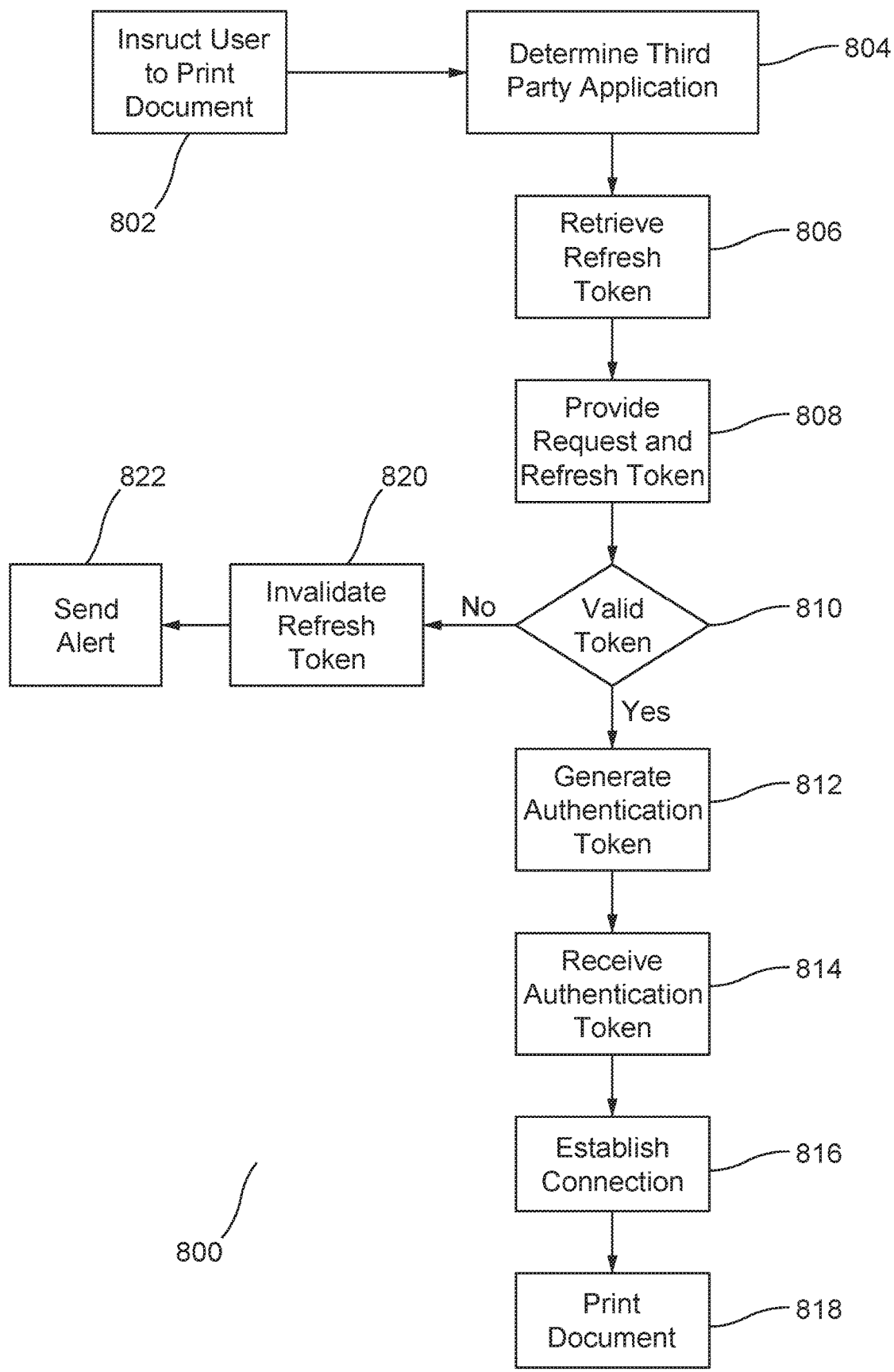
FIG. 8 illustrates a flowchart for using a refresh token to establish a connection between a third party application and a printing device according to the disclosed embodiments.

FIG. 8 depicts a flowchart 800 for using refresh token 132 to establish connection 190 according to the disclosed embodiments. The disclosure of flowchart 800 may refer to features shown in FIGS. 1-3 for illustrative purposes. The embodiments disclosed by flowchart 800, however, are not limited to the features of FIGS. 1-3. Further, refresh token 136 may be generated and used in the same manner as refresh token 132, as disclosed below.

Step 802 executes by instructing mobile application 110 to print a document from third party application 112. In some embodiments, the document is to be printed on printing device 104. Alternatively, an application on mobile device 108 may be instructed to print a document and mobile application 110 launched to facilitate the printing to printing device 104. Step 804 executes by determining which third party application should be accessed to print the document. In some embodiments, mobile application 100 may determine the third party application. In other embodiments, the user may indicate the third party application that has the document.

Step 806 executes by retrieving the appropriate refresh token for the third party application. In the example provided above, refresh token 132 is stored on mobile device 108 and retrieved by mobile application 110. Mobile application 110 identifies refresh token 132 as corresponding to third party application 112. Mobile application 110 may check to make sure refresh token 132 is not corrupt or expired. Step 808 executes by providing the request to print the document and refresh token 132 to third party application. Preferably, these items are provided by mobile application 110.

Step 810 executes by determining whether refresh token 132 is valid. As disclosed above, refresh token 132 may be invalidated for several reasons, such as user cancellation, expired over time or use, and the like. Further, third party application 112 may determine whether the information in refresh token 132 corresponds to the user information provided by the user. In some instances, the information may not match. For example, mobile application 110 may send refresh token 132 to the wrong third party application, such as third party application 116.

If step 810 is yes, then step 812 executes by generating authentication token 130, as disclosed above. Authentication token 130 is provided to mobile application 110. Step 816 executes by establishing connection 190 between third party application 112 and printing device 104, as disclosed above. Step 818 executes by printing the document at printing device 104.

If step 810 is no, then refresh token 132 is invalid or corrupt. Third party application 112 rejects the refresh token and does not generate authentication token 130. Thus, step 820 executes by invalidating refresh token 132. Refresh token 132 may be deleted by third party application. A command may be sent to mobile application 110 to delete refresh token 132 from mobile device 108. Step 822 executes by sending an alert to the user, such as through an email address. The alert may be displayed on mobile device 108 that the request to print was denied.

According to the disclosed embodiments, mobile application 110 may store refresh tokens for more than one third party application. Mobile application 110, therefore, does not need to store user information for each application. Instead, a refresh token may be provided to generate and receive an authentication token to print a document. The user also does not need to enter information each time a document is printed.

According to the disclosed embodiments, operations may be performed on a printing device from an application or service within another network or not really associated with the printing device. The documents processed on the printing device may not come from a printer driver that specifically identifies the printing device to receive the document. Instead, it comes from an application as directed by a mobile application, which also may be on another network. Through the exchange of an authentication token and the use of verification codes, the job is authenticated to be processed on the printing device without the need to enter or provide private information to the printing device. The user may provide such information from the security of his/her mobile device.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more MFP systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A method for authentication of a third party application to connect to a printing device using a mobile application, the method comprising:
   requesting a refresh token from the third party application by the mobile application;
   generating the refresh token, wherein the refresh token includes user information related to the third party application;
   receiving the refresh token at the mobile application;
   generating an authentication token in response to the refresh token; and
   establishing a connection between the third party application and the printing device based on the authentication token.

2. The method of claim 1, further comprising providing the user information to the mobile application to send to the third party application.

3. The method of claim 1, further comprising pairing the authentication token with information about the printing device.

4. The method of claim 3, further comprising storing the authentication token and the information about the printing device.

5. The method of claim 1, wherein the generating of the refresh token includes generating a data string from the user information.

6. The method of claim 5, wherein the user information includes a user name or password.

7. The method of claim 1, further comprising invaliding the refresh token at the third party application.

8. A method for using a refresh token with a mobile application to print a document, the method comprising:
providing user information to a third party application having a document;
generating a refresh token based on the user information;
providing the refresh token to a mobile application;
sending the refresh token to the third party application;
generating an authentication token in response to the refresh token; and
printing the document directly to a printing device from the third party application using the authentication token.

9. The method of claim 8, further comprising retrieving information for the printing device.

10. The method of claim 9, further comprising pairing the retrieved information for the printing device with the authentication token.

11. The method of claim 8, wherein the providing the refresh token includes providing a request to print the document to the third party application.

12. The method of claim 8, further comprising deleting the user information from the mobile application upon receipt of the refresh token.

13. The method of claim 8, further comprising storing the authentication token at a document processing platform.

14. The method of claim 13, further comprising receiving the authentication token at the printing device from the document processing platform.

15. The method of claim 8, further comprising invalidating the refresh token at the third party application.

16. A system to use a refresh token with a mobile application to establish a connection between a third party application and a printing device, the system comprising:
a printing device having identification information;
a mobile device configured to execute the mobile application, wherein the mobile device obtains the identification information for the printing device for use by the mobile application;
the mobile application configured to receive and to store the refresh token from the third party application, wherein the refresh token includes user information associated with the third party application;
the third party application configured to generate an authentication token upon receipt of the refresh token from the mobile application; and
a document processing platform to store the authentication token and the identification information for the printing device provided by the mobile application, and configured to provide the authentication token to the printing device upon receipt of the identification information from the printing device,
wherein a connection is established between the printing device and the third party application according to the authentication token.

17. The system of claim 16, further comprising a first network and a second network, wherein the printing device is on the first network and the mobile device is on the second network.

18. The system of claim 16, wherein the refresh token is generated by the third party application based on the user information.

19. The system of claim 16, wherein the mobile application is configured to delete the user information upon receipt of the refresh token.

20. The system of claim 16, wherein the authentication token includes an expiration parameter.

* * * * *